United States Patent [19]

Maspero et al.

[11] 3,857,867

[45] Dec. 31, 1974

[54] OLEFIN METALLORGANIC COMPLEXES OF SALINE TYPE AND PROCESS FOR THE PREPARATION THEREOF

[75] Inventors: Federico Maspero, Milan; Emilio Perrotti, San Donato Milanese; Franco Simonetti, Milan, all of Italy

[73] Assignee: Snam Progetti S.p.A., Milan, Italy

[22] Filed: Dec. 27, 1972

[21] Appl. No.: 319,061

[30] Foreign Application Priority Data
Dec. 28, 1971 Italy................................. 33009/71

[52] U.S. Cl........ 260/429 R, 252/431 R, 252/431 P, 252/431 N
[51] Int. Cl. ............................................ C07f 15/00
[58] Field of Search............. 460/429 R; 260/429 R

[56] References Cited
OTHER PUBLICATIONS

Schrock et al. J. Am. Chem. Soc., 93, p. 2397–2407.
Johnson et al. J. Am. Chem. Soc. 91, p. 5186–7.
Johnson et al. J. Chem. Soc. A 1970, p. 1738–1745.
Johnson et al. Chem. Abstracts 71(1969) No. 91626.
Shapley et al. J. Am. Chem. Soc. 91, p. 2816–17.
Green et al. J. Chem. Soc. A, 1971 p. 2334–2337.
Green et al. Chem. Communications 1970 p. 1553–4.

*Primary Examiner*—Arthur P. Demers
*Attorney, Agent, or Firm*—Ralph M. Watson, Esq.

[57] ABSTRACT

New complexes of saline type, which are represented by the formula:

[Me $L_m$ $L'_n$ $A_a$] $X_x$ wherein, Me represents Rh, Ir, Ru, Pd or Pt; L, L' represent primary or secondary olefin, linear, branched or cyclic, having from 2 to 12 carbon atoms, and may be substituted by functional unsaturated compounds such as unsaturated nitriles; A is a neutral ligand such as a nitrile, phosphine, phosphite, arsine or stibine; X is an anion such as $BF_4^-$, $PF_6^-$, $ClO_4^-$ or $NO_3^-$; $m + n$ equals 1, 2 or 3; $a$ is 0, 1, 2 or 3; and $x$ is 1 or 2, are useful as catalysts in olefin reactions such as the hydrogenation of olefins at 50°–80°C., in the oligomerization or dimerization or codimerization of olefins and in the hydration of olefins by reaction with water in alcohol solvents.

3 Claims, No Drawings

OLEFIN METALLORGANIC COMPLEXES OF SALINE TYPE AND PROCESS FOR THE PREPARATION THEREOF

The present invention relates to novel olefin metallorganic complexes of saline type, the processes for preparing same and the employment thereof.

Olefin complexes of transition metals are known, they being of neutral type. Such complexes contain in their molecules, besides metal and olefin, also some other anionic ligands and neutral molecules, as for instance halogen ions, nitriles, phosphines, phosphites, arsines and stibines. It has now been found that such compounds can be changed into complexes of saline type, wherein the complex is a cation.

Such complexes of saline nature can be obtained by reacting the aforementioned neutral compounds with copper or silver salts in the presence of complexing agents or with copper or silver complex salts.

The complexes of saline type thus obtained can be represented by the following general formula $$[Me\ L_m\ L'_n\ A_a]X_x$$

wherein
Me = Rh Ir Ru Pd Pt
L, L' = primary or secondary olefin, which can be linear, branched or cyclic, having from 2 to 12 carbon atoms, and may be substituted by functional unsaturated compounds such as unsaturated nitriles
A = is a neutral ligand such as a nitrile, phosphine, phosphite, arsine or stibine
X = is an anion such as $BF_4^-$ $PF_6^-$ $ClO_4^-$ $NO_3^-$
$(m+n) = 1, 2$ or $3$
$a = 0, 1, 2, 3$
$x = 1$ or $2$ As mentioned, these compounds are obtained by reacting, at room temperature, a neutral complex such as $(Rh\ L_2\ Hal)_2$ (wherein Hal is halogen) with $[Cu\ (A)_4]X$ or $[Cu\ L\ A_2]X$ or $Ag\ X + A$ in a solution of an inert solvent such as $CH_2\ Cl_2$ THF and the like.

After the removal of the precipitate constituted by Ag Hal or Cu Hal, a solution is obtained wherefrom, by crystallizing or by evaporating the solvent, the inventive compound is obtained.

Preferably the reaction is carried out in the presence of the olefin which is to be bound. in the case of normally gaseous olefins, it is advantageous to employ the olefin under pressure.

The obtained complex can be subjected to a treatment under vacuum to reduce the olefin content. In such a way, for instance, it is possible to obtain a complex containig two olefin moles from a complex containig three olefin moles.

The reaction runs at room temperature or at a slightly higher temperature.

The obtained compounds have been characterized by infrared spectroscopy analysis on solids, by MMR spectra on solutions and by X-Ray spectra.

On the basis of such analyses the pentacoordinate compounds were found to have a bipyramidal structure, wherein three molecules of olefin lie in the same plane as the metal atom and two molecules of A lie on the apices.

The inventive compounds can be utilized as catalysts in reactions of olefins both in the homogeneous phase and supported on suitable carriers.

Particularly they can be employed for the hydrogenation of olefins at 50° – 80°C with practically quantitative yields, for the oligomerization of olefins, the dimerization and codimerization and for the hydration of olefins by reaction with water in alcohol solvents.

The following working examples illustrate the invention without limiting same.

EXAMPLE 1

The solution of $Cu\ (CH_3\ CN)_4\ BF_4$ (1.625 g) dissolved in $CH_2\ Cl_2$ degassed with ethylene (250 ml) was added to $[Rh\ (C_2H_4)_2\ Cl]_2$ (1.0 g) dissolved in pure $CH_2\ Cl_2$ degassed with ethylene (250 ml).

It was briefly stirred and after 10 minutes Cu Cl, which was precipitated, was filtered by working in a vessel also saturated with ethylene.

The solution was left to stand for one day, during which yellow crystals were formed consisting of $[Rh\ (C_2\ H_4)_3\ (CH_3\ CN)_2]\ BF_4$.

EXAMPLE 2

The preceding compound was powdered under a nitrogen atmosphere and was kept under the same atmosphere for some hours.

The final product corresponded to the formula $[Rh\ (C_2\ H_4)_2\ (CH_3\ CN)_2]\ BF_4$.

EXAMPLE 3

$[Rh\ (C_8\ H_{14})_2\ Cl]_2$ (0.70 g) was dissolved in 100 ml of $CH_2\ Cl_2$ degassed by $N_2$.

The solution of $Cu\ (CH_3\ CN)_4\ BF_4$ (0.63 g) in 100 ml of $CH_2\ Cl_2$ degassed by $N_2$ was added. After ten minutes the Cu CL which precipitated was filtered, also under a nitrogen atmosphere. Cyclooctene (2 ml) and ligroin (20 ml) were added to the filtered solution. A precipitate was obtained consisting of yellow crystals of $[Rh\ (C_8\ H_{14})\ (CH_3\ CN)_3]\ BF_4$.

EXAMPLE 4

$[Rh\ (C_8\ H_{14})_2\ Cl]$ (0.70 g) was dissolved in 100 ml of degassed $CH_2\ Cl_2$.

The solution of $[Cu\ (C_8\ H_{14})(CH_3\ CN)_2]BF_4$ (0.70 g) in 50 ml of degassed $CH_2\ Cl_2$ was added, at −20°C.

After 30 minutes a precipitate was filtered consisting of Cu Cl. To the filtered solution was added, also at −20°C, ligroin (150 ml). Yellow crystals were precipitated which were constituted by $[Rh\ (C_8\ H_{14})_2\ (CH_3\ CN)_2]\ BF_4$.

We claim:
1. Complexes of the formula:
   $[Rh(L)_n(CH_3CN)_a]X$
   wherein L is an olefin selected from the group consisting of ethylene and cyclooctene; and X is an anion selected from the group consisting of $BF_4^-$, $PF_6^-$, $ClO_4^-$ and $NO_3^-$; provided that when L is ethylene and $n$ is 2 or 3, $a$ is 2; and when L is cyclooctene and $n$ is 1, $a$ is 3 and when $n$ is 2, $a$ is 2 or 3.

2. Complexes according to claim 1 wherein L is ethylene and X is $BF_4^-$.

3. Complex according to claim 2 having the formula $[Rh(ethylene)_3(CH_3CN)_2]BF_4$.

* * * * *